(12) United States Patent
Hatano

(10) Patent No.: US 10,323,337 B2
(45) Date of Patent: Jun. 18, 2019

(54) POLYESTER FIBER FOR ARTIFICIAL HAIR, PROCESS FOR PRODUCING SAME, AND HAIR ORNAMENT PRODUCT INCLUDING SAME

(71) Applicant: Kaneka Corporation, Osaka (JP)

(72) Inventor: Takanori Hatano, Osaka (JP)

(73) Assignee: KANEKA CORPORATION, Osaka (JP)

(*) Notice: Subject to any disclaimer, the term of this patent is extended or adjusted under 35 U.S.C. 154(b) by 4 days.

(21) Appl. No.: 15/728,853

(22) Filed: Oct. 10, 2017

(65) Prior Publication Data

US 2018/0030620 A1 Feb. 1, 2018

Related U.S. Application Data

(63) Continuation of application No. PCT/JP2016/059903, filed on Mar. 28, 2016.

(30) Foreign Application Priority Data

Apr. 10, 2015 (JP) ................. 2015-080734

(51) Int. Cl.
| | |
|---|---|
| *C08G 63/02* | (2006.01) |
| *D01F 6/62* | (2006.01) |
| *A41G 3/00* | (2006.01) |
| *D01F 1/07* | (2006.01) |
| *A41G 5/00* | (2006.01) |
| *A63H 3/44* | (2006.01) |
| *C08K 5/00* | (2006.01) |
| *D01F 6/84* | (2006.01) |

(52) U.S. Cl.
CPC ............ *D01F 6/62* (2013.01); *A41G 3/00* (2013.01); *A41G 5/004* (2013.01); *A63H 3/44* (2013.01); *C08K 5/0066* (2013.01); *D01F 1/07* (2013.01); *D01F 6/84* (2013.01)

(58) Field of Classification Search
USPC ............... 524/116, 117, 119; 528/271, 272
See application file for complete search history.

(56) References Cited

U.S. PATENT DOCUMENTS

| 3,423,163 A * | 1/1969 | Magat ............... D06M 14/22 |
| | | 522/89 |
| 2006/0154062 A1 | 7/2006 | Kowaki et al. |
| 2006/0194044 A1 | 8/2006 | Kowaki et al. |
| 2007/0155870 A1 | 7/2007 | Kowaki et al. |
| 2008/0085957 A1* | 4/2008 | Masuda ............ A41G 3/0083 |
| | | 524/119 |
| 2015/0051328 A1* | 2/2015 | Ye ............................. C08K 7/14 |
| | | 524/127 |
| 2015/0126644 A1 | 5/2015 | Higami et al. |
| 2015/0141559 A1 | 5/2015 | Hashimoto et al. |

FOREIGN PATENT DOCUMENTS

| EP | 1650333 A1 | 4/2006 |
| EP | 1693490 A1 | 8/2006 |
| EP | 2192212 A1 | 6/2010 |
| JP | 2005-042234 A | 2/2005 |
| JP | 2005-273032 A | 10/2005 |
| JP | 2006-291394 A | 10/2006 |
| JP | 2007-126786 A | 5/2007 |
| JP | 2009-197379 A | 9/2009 |
| WO | 2005/056894 A1 | 6/2005 |
| WO | 2005/100650 A1 | 10/2005 |
| WO | 2013/172387 A1 | 11/2013 |
| WO | 2013/180281 A1 | 12/2013 |

OTHER PUBLICATIONS

International Search Report issued in International Application No. PCT/JP2016/059903; dated Jun. 14, 2016 (2 pages).

* cited by examiner

*Primary Examiner* — Terressa Boykin
(74) *Attorney, Agent, or Firm* — Osha Liang LLP

(57) ABSTRACT

A polyester-based fiber for artificial hair includes a polyester-based resin composition, wherein the polyester-based resin composition includes: 100 parts by weight of a polyester resin; 5 to 40 parts by weight of a brominated epoxy-based flame retardant; 0.05 to 3 parts by weight of a polyester resin molecular weight modifier; and 0.2 to 3 parts by weight of a phosphite-based compound, and wherein the polyester resin is one or more selected from the group consisting of polyalkylene terephthalate and a copolymerized polyester including polyalkylene terephthalate. A method for producing the polyester-based fiber for artificial hair includes melt kneading the polyester resin composition and melt spinning the polyester resin composition after the melt kneading into yarns. A hair ornament product includes the polyester-based fiber.

12 Claims, 1 Drawing Sheet

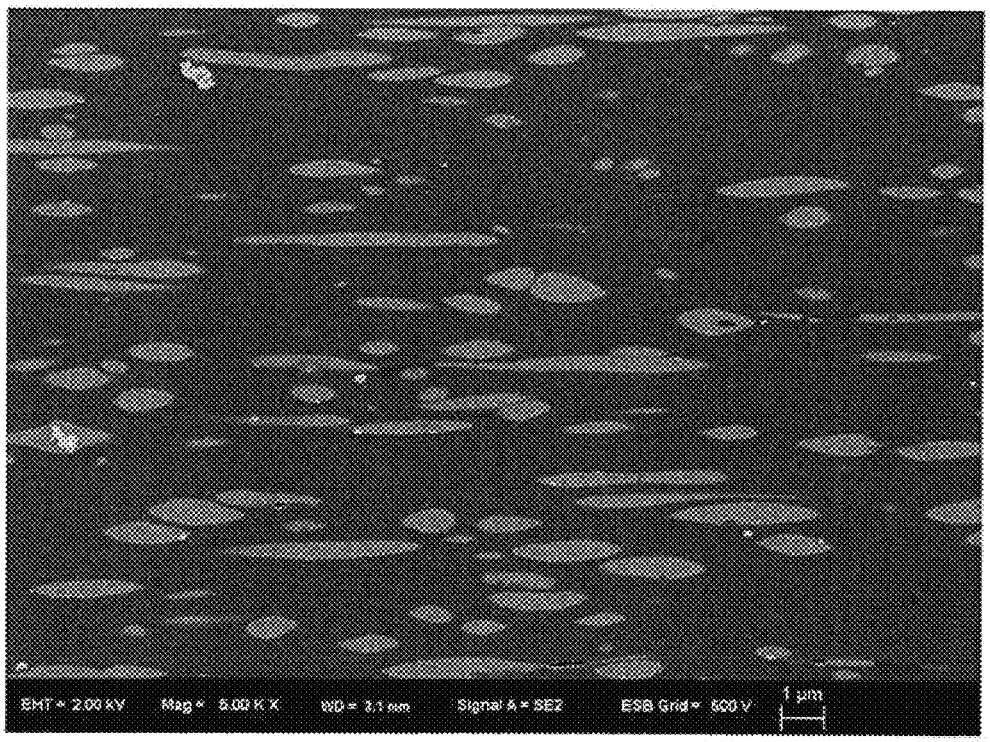

POLYESTER FIBER FOR ARTIFICIAL HAIR, PROCESS FOR PRODUCING SAME, AND HAIR ORNAMENT PRODUCT INCLUDING SAME

TECHNICAL FIELD

One or more embodiments of the present invention relate to a polyester-based fiber for artificial hair capable of being used as an alternative to human hair, a process for producing the same, and a hair ornament product including the same. Specifically, one or more embodiments of the present invention relate to a polyester-based fiber for artificial hair that has excellent spinning stability and excellent flame retardance and having gloss close to that of human hair, a process for producing the same, and a hair ornament product including the same.

BACKGROUND ART

In hair ornament product s such as hairpieces, hair wigs, crepe hair, hair bands, and doll hair, conventionally, human hair is mainly used. However, in recent years, it is becoming difficult to obtain human hair, and human hair is being replaced with fibers for artificial hair using synthetic fibers, such as acrylic-based fibers (e.g., modacrylic fibers), polyvinyl chloride-based fibers, and polyester-based fibers. In particular, polyester-based fibers have high gloss on the fiber surface thereof. Thus, when polyester-based fibers for hair ornament products, particularly for hair products attached to human hair such as hair wigs and hairpieces, are used, the hair overall looks unnatural due to the difference in gloss between the fibers and the human hair.

Thus, various processes for improving the gloss of polyester-based fibers have been investigated. For example, as a process for adjusting gloss, Patent Document 1 proposes a technique for adjusting fiber gloss by incorporating organic particles or inorganic particles into a polyester-based fiber for artificial hair. This is a technique for forming protrusions on a fiber surface using fine particles. In order to form very small recesses on the surface of a fiber for artificial hair, alkali reducing treatment has to be performed, and the processing steps become complex and costs increase. Furthermore, depending on the amount of organic particles or inorganic particles added, the color development property (hue) deteriorates, and the tactile feel is rough and vastly different from that of human hair, and thus a polyester-based fiber for artificial hair having gloss and a tactile feel close to that of human hair has not been obtained.

Furthermore, Patent Document 2 discloses a technique for suppressing gloss by adding an acidic phosphorus-based compound. It is stated that the addition of the acidic phosphorus-based compound reduces the viscosity of a polyester resin and, at the same time, reduces the dispersibility of a brominated epoxy-based flame retardant blended therewith, so that projections are formed on the fiber surface layer to reduce the gloss. Patent Document 3 discloses a technique for suppressing gloss, using antimony oxide. It is stated that this process allows a reaction of a brominated epoxy-based flame retardant to occur due to the presence of antimony oxide, to form agglomerates having a certain size, so that projections are formed on the fiber surface layer as in Patent Document 2. However, in the case of the technique described in Patent Document 2, an acidic phosphorus-based compound is likely to absorb moisture, and thus the gloss suppressing effect may become unstable. Furthermore, in the case of the technique described in Patent Document 3, yarns break when spun for a long period of time because antimony oxide is used.

Meanwhile, fibers for artificial hair are required to have high flame retardance. Patent Document 4 describes a flame retardant polyester-based artificial hair containing a bromine-containing flame retardant, an antimony compound, and a phosphite-based compound. Patent Document 5 describes a flame retardant polyester-based artificial hair containing a bromine-containing flame retardant, an antimony compound, and a heat-stabilizer such as a phosphite compound. Patent Document 6 describes a flame retardant polyester-based artificial hair containing a brominated epoxy-based flame retardant and a reaction accelerator such as a phosphite compound. However, in Patent Documents 4 to 6, gloss is not mentioned.

CITATION LIST

Patent Documents

Patent Document 1: JP 2005-42234A
Patent Document 2: WO 2013/180281
Patent Document 3: WO 2013/172387
Patent Document 4: JP 2005-273032A
Patent Document 5: JP 2006-291394A
Patent Document 6: WO 2005/56894

SUMMARY

One or more embodiments of the present invention provide a polyester-based fiber for artificial hair having excellent spinning stability and excellent flame retardance and having gloss close to that of human hair, a process for producing the same, and a hair ornament product including the same.

One or more embodiments of the present invention relate to a polyester-based fiber for artificial hair containing a polyester-based resin composition, wherein the polyester-based resin composition contains 5 to 40 parts by weight of a brominated epoxy-based flame retardant, 0.05 to 3 parts by weight of a polyester resin molecular weight modifier, and 0.2 to 3 parts by weight of a phosphite-based compound, with respect to 100 parts by weight of a polyester resin, and the polyester resin is one or more selected from a group consisting of polyalkylene terephthalate and a copolymerized polyester mainly containing polyalkylene terephthalate.

Also, one or more embodiments of the present invention relate to a process for producing the above-described polyester-based fiber for artificial hair, including: melt kneading a polyester resin composition containing 5 to 40 parts by weight of a brominated epoxy-based flame retardant, 0.05 to 3 parts by weight of a polyester resin molecular weight modifier, and 0.2 to 3 parts by weight of a phosphite-based compound, with respect to 100 parts by weight of a polyester resin, and melt spinning a polyester resin composition after the melt kneading into yarns, thereby obtaining a polyester-based fiber for artificial hair.

It may be possible that the polyester resin molecular weight modifier is one or more selected from a group consisting of terephthalic acid, isophthalic acid, dimethyl terephthalate, and bis(2-hydroxyethyl) terephthalate.

It may be possible that the phosphite-based compound has a pentaerythritol diphosphite structure represented by a general formula (1) below:

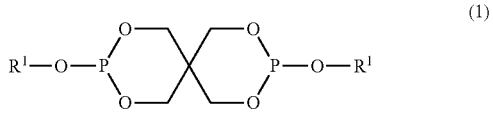

(1)

where those represented by $R^1$ are each a linear or branched hydrocarbon group with 4 to 20 carbon atoms, or an aromatic hydrocarbon group substituted with an alkyl group or an aryl group, and may be the same or different from each other.

It may be possible that the polyester-based resin composition contains 0 to 5 parts by weight of sodium antimonate with respect to 100 parts by weight of the polyester resin.

It may be possible that the polyalkylene terephthalate is at least one polymer selected from a group consisting of polyethylene terephthalate, polypropylene terephthalate, polybutylene terephthalate, and polycyclohexane dimethylene terephthalate.

It may be possible that the brominated epoxy-based flame retardant is present in a structure represented by a general formula (2) below:

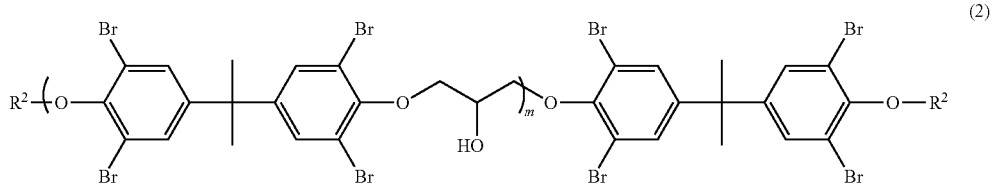

(2)

where m is 10 to 200, and those represented by $R^2$ are each a functional group represented by a general formula (3) or (4) below, and may be the same or different from each other

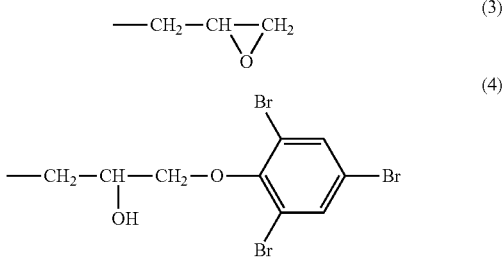

Also, one or more embodiments of the present invention relate to a hair ornament product including the above-described polyester-based fiber for artificial hair.

The hair ornament product may be one selected from a group consisting of a hair wig, a hairpiece, a weaving, a hair extension, braid hair, a hair accessory, and doll hair.

According to one or more embodiments of the present invention, it is possible to provide a polyester-based fiber for artificial hair having excellent spinning stability and excellent flame retardance and having gloss close to that of human hair, and a hair product including the same. Furthermore, according to one or more embodiments of the production process, it is possible to produce a polyester-based fiber for artificial hair having good spinning stability, excellent flame retardance, and gloss close to that of human hair.

BRIEF DESCRIPTION OF THE DRAWINGS

FIG. 1 is a scanning electron micrograph (5000×) along a cross-section in a direction parallel to a fiber axis direction of a polyester-based fiber for artificial hair in Example 1.

DETAILED DESCRIPTION OF THE EMBODIMENTS

The inventors conducted an in-depth study, and found that it is possible to realize gloss close to that of human hair by suppressing gloss, while realizing good spinning stability and good flame retardance, by melt spinning, into a fiber, a polyester resin composition obtained by mixing a brominated epoxy-based flame retardant, a polyester resin molecular weight modifier, and a phosphite-based compound each in a predetermined amount with a polyester resin. The polyester-based fiber for artificial hair according to one or more embodiments of the present invention is composed of a polyester resin composition, and the polyester-based resin composition contains 5 to 40 parts by weight of a brominated epoxy-based flame retardant, 0.05 to 3 parts by weight of a polyester resin molecular weight modifier, and 0.2 to 3 parts by weight of a phosphite-based compound, with respect to 100 parts by weight of a polyester resin.

Hereinafter, one or more embodiments of the present invention will be specifically described.

The polyester resin in one or more embodiments of the present invention is one or more selected from a group consisting of polyalkylene terephthalate and a copolymerized polyester mainly containing polyalkylene terephthalate. The polyalkylene terephthalate is not particularly limited and may be, for example, polyethylene terephthalate, polypropylene terephthalate, polybutylene terephthalate, or polycyclohexane dimethylene terephthalate. The copolymerized polyester mainly containing polyalkylene terephthalate is not particularly limited and may be, for example, a copolymerized polyester mainly containing polyalkylene terephthalate such as polyethylene terephthalate, polypropylene terephthalate, polybutylene terephthalate, or polycyclohexane dimethylene terephthalate, and further containing other copolymerizable components. In one or more embodiments of the present invention, "mainly contain" refers to containing in an amount of 80 mol % or more. "Copolymerized polyester mainly containing polyalkylene terephthalate" refers to a copolymerized polyester containing 80 mol % or more of polyalkylene terephthalate.

Examples of the other copolymerizable components include: polycarboxylic acids such as isophthalic acid, orthophthalic acid, naphthalenedicarboxylic acid, paraphenylenedicarboxylic acid, trimellitic acid, pyromellitic acid, succinic acid, glutaric acid, adipic acid, suberic acid, azelaic acid, sebacic acid, and dodecanedioic acid, and their derivatives; dicarboxylic acids and their derivatives containing sulfonates such as 5-sodiumsulfoisophthalic acid and dihydroxyethyl 5-sodiumsulfoisophthalate; 1,2-propanediol;

1,3-propanediol; 1,4-butanediol; 1,6-hexanediol; neopentyl glycol; 1,4-cyclohexanedimethanol; diethylene glycol; polyethylene glycol; trimethylolpropane; pentaerythritol; 4-hydroxybenzoic acid; and ε-caprolactone.

Also, part of the bromine of the general formula (2) below may be eliminated or added, as long as the bromine content in the molecules of the brominated epoxy-based flame retardant does not change significantly.

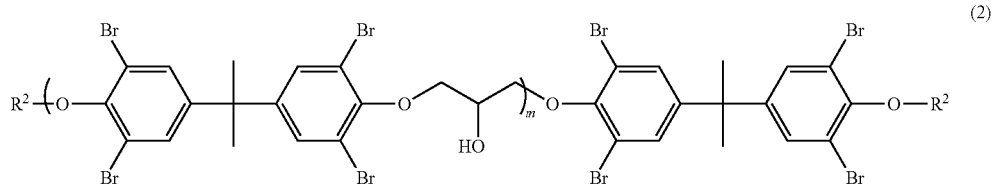

(2)

Specific examples of the copolymerized polyester mainly containing polyalkylene terephthalate include a polyester obtained through copolymerization of polyethylene terephthalate as a main component with one compound selected from a group consisting of an ethylene glycol ether of bisphenol A, 1,4-cyclohexanedimethanol, isophthalic acid, and dihydroxyethyl 5-sodiumsulfoisophthalate.

The polyalkylene terephthalate and the copolymerized polyester mainly containing polyalkylene terephthalate may be used alone or in a combination of two or more. In particular, polyethylene terephthalate, polypropylene terephthalate, polybutylene terephthalate, a polyester obtained through copolymerization of polyethylene terephthalate as a main component with ethylene glycol ether of bisphenol A, a polyester obtained through copolymerization of polyethylene terephthalate as a main component with 1,4-cyclohexanedimethanol, a polyester obtained through copolymerization of polyethylene terephthalate as a main component with isophthalic acid, a polyester obtained through copolymerization of polyethylene terephthalate as a main component with dihydroxyethyl 5-sodiumsulfoisophthalate, and the like may be used alone or in a combination of two or more.

The intrinsic viscosity (IV) of the polyester resin is not particularly limited and may be 0.6 to 1.2. One or more embodiments of the present invention are characterized by reducing the molecular weight using a later-described molecular weight modifier. It may be possible to use an available polyester resin having a relatively high IV.

The brominated epoxy-based flame retardant in one or more embodiments of the present invention may use, as a raw material, a brominated epoxy-based flame retardant having an epoxy group or tribromophenol at the end of the molecule. The structure of the brominated epoxy-based flame retardant after melt kneading is not particularly limited, and it is sufficient that the structure has 80 mol % or more of the constitutional unit represented by the general formula (2) when the total amount of the constitutional unit represented by the general formula (2) below and other constitutional units in which at least part of the (2) is modified is taken as 100 mol %. For example, it is sufficient that the end of the molecule of the brominated epoxy-based flame retardant is an epoxy group represented by the general formula (3) below or tribromophenol represented by the general formula (4) below, and the end of the molecule may be bound to a polyester component through an ester group. Furthermore, part of the structure of the brominated epoxy-based flame retardant, other than the end of the molecule, may be changed. For example, the brominated epoxy-based flame retardant may have a branched structure in which the secondary hydroxyl group and the epoxy group are bound.

In the general formula (2) above, m is 10 to 200, and those represented by $R^2$ are each a functional group represented by the general formula (3) or (4) below, and may be the same or different from each other.

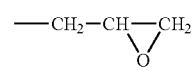 (3)

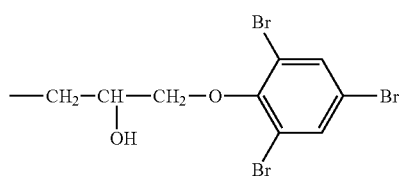 (4)

The brominated epoxy-based flame retardant according to one or more embodiments of the present invention may be a polymeric brominated epoxy-based flame retardant, for example, as represented by the general formula (2) above. Examples of the polymeric brominated epoxy-based flame retardant as represented by the general formula (2) above include a commercially available product such as a brominated epoxy-based flame retardant (trade name "SR-T20000") manufactured by Sakamoto Yakuhin Kogyo Co., Ltd. Increasing the molecular weight of the brominated epoxy-based flame retardant by using a later-described phosphite-based compound together is important when suppressing the gloss of a polyester-based fiber to make it close to that of human hair. Thus, when the molecular weight of the brominated epoxy-based flame retardant is low, the amount of phosphite-based compound added may be increased to be within a range that is not detrimental. The brominated epoxy-based flame retardant may have a number average molecular weight of 10000 or more.

The brominated epoxy-based flame retardant according to one or more embodiments of the present invention may be used in an amount of 5 to 40 parts by weight, 8 to 30 parts by weight, or 10 to 25 parts by weight, with respect to 100 parts by weight of the polyester resin. If the brominated epoxy-based flame retardant is in an amount of less than 5 parts by weight, the gloss reducing effect is not sufficient, and the flame retardance is also insufficient. On the other hand, if the brominated epoxy-based flame retardant is in an amount of more than 40 parts by weight, the dispersion into the polyester resin functioning as the matrix is poor, and thus the spinning stability deteriorates.

The phosphite-based compound in one or more embodiments of the present invention may be selected, for example, from trialkyl phosphites, triaryl phosphites, and alkylaryl phosphites. Specific examples of the phosphites include trioctyl phosphite, tridecanyl phosphite, triphenyl phosphite, tris(nonylphenyl) phosphite, tris(2,4-di-t-butylphenyl) phosphite, didecanylphenyl phosphite, octyldiphenyl phosphite, 2,2'-methylenebis(4,6-t-butylphenyl)octyl phosphite, distearyl pentaerythritol diphosphite, bis(2,4-di-t-butylphenyl) pentaerythritol diphosphite, bis(2,6-di-t-butyl-p-tolyl)pentaerythritol diphosphite, and bis(2,4-dicumylphenyl) pentaerythritol diphosphite.

It is seen that the addition of phosphites increases the molecular weight of the brominated epoxy-based flame retardant, which changes the state of the brominated epoxy-based flame retardant dispersed in the polyester resin functioning as the matrix. The brominated epoxy-based flame retardant is dispersed in a linear state having an aspect ratio that is high in the fiber axis direction when no phosphites are added, whereas, it seems that the addition of phosphites reduces the aspect ratio, so that unevenness is provided on the fiber surface to reduce the gloss. Note that, if a later-described polyester resin molecular weight modifier is not added, the resin viscosity becomes too high although depending on the amount of phosphites added, and thus spinning may be unstable.

The phosphites have different properties of increasing the molecular weight of the brominated epoxy-based flame retardant due to a difference in their structures, and thus reduce the gloss to different levels. Among the phosphites, a phosphite having a pentaerythritol diphosphite structure represented by the general formula (1) below may be used because it is highly able to increase the molecular weight of the brominated epoxy-based flame retardant and to reduce the gloss of the polyester-based fiber. Furthermore, the phosphites may be in solid form in consideration of being added from a hopper during melt spinning, and the compound having this structure is effective also in this aspect.

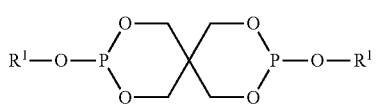

(1)

In the general formula (1) above, those represented by $R^1$ are each a linear or branched hydrocarbon group with 4 to 20 carbon atoms, or an aromatic hydrocarbon group substituted with an alkyl group or an aryl group, and may be the same or different from each other.

The amount of phosphite-based compound added is 0.2 to 3 parts by weight with respect to 100 parts by weight of the polyester resin. As described above, the ability to reduce the gloss varies depending on the structure, and thus there is an optimal amount for each phosphite-based compound to be added. If the phosphite-based compound has a pentaerythritol diphosphite structure, the amount added may be 0.2 to 1.5 parts by weight with respect to 100 parts by weight of the polyester resin. If the amount added is less than 0.2 parts by weight, artificial hair using the obtained fiber looks unnatural in terms of gloss when compared with human hair. If the amount added is more than 3 parts by weight, the viscosity of the polyester resin composition becomes too high, and thus spinning may be unstable. In this case, a later-described polyester resin molecular weight modifier may be used to adjust the viscosity, but it may generate coarse particles of the brominated epoxy-based flame retardant, and reduce the spinning stability and cause yarn breakage and the like.

The polyester resin molecular weight modifier in one or more embodiments of the present invention is not particularly limited and may be any compound having an ester structure with a relatively low molecular weight, such as a molecular weight of 10000 or less. Typical examples thereof include phthalate esters such as dioctyl phthalate, diisononyl phthalate, diisodecyl phthalate, diundecyl phthalate, dilauryl phthalate, dimethyl terephthalate, dimethyl isophthalate, and bis(2-hydroxyethyl) terephthalate. Furthermore, as the molecular weight modifier, carboxylic acids such as isophthalic acid and terephthalic acid are effective, and low-molecular polyester resins having a number average molecular weight of 10000 or less are also effective as the molecular weight modifier.

When the polyester resin molecular weight modifier is present together with a polyester resin at a temperature where the polyester resin melts, the molecular weight modifier exhibits the function of reducing the molecular weight of the polyester resin functioning as the matrix by facilitating transesterification. As long as an ester compound is used, the structure of the polyester resin is not significantly changed, and thus this molecular weight modifier is advantageous in that no harmful side reaction occurs. Essentially, a low-molecular ester compound may be used, but, for example, terephthalic acid and isophthalic acid mentioned above may be used in a small amount within a range in which spinning stability does not deteriorate. In one or more embodiments of the present invention, the phosphite-based compound that is a component increases the molecular weight of the brominated epoxy-based flame retardant, and, when the brominated epoxy-based flame retardant whose molecular weight has increased is dispersed in the form of particles in the polyester resin functioning as the matrix, the gloss is reduced, whereas, if only the phosphite compound is used together with the brominated epoxy-based flame retardant, the viscosity increases beyond the range where spinning can be stably performed, and thus reducing the viscosity of the polyester resin functioning as the matrix using the polyester resin molecular weight modifier is necessary to stably facilitate the spinning. Furthermore, if the brominated epoxy-based flame retardant is used together with the phosphite compound and the polyester resin molecular weight modifier, the tactile feel of the polyester-based fiber for artificial hair is also satisfactory.

The polyester resin molecular weight modifier may be in solid form in consideration of being loaded into an extruder for melt spinning, and dimethyl terephthalate, bis(2-hydroxyethyl) terephthalate, isophthalic acid, and terephthalic acid may be used in this aspect. Furthermore, dimethyl terephthalate and bis(2-hydroxyethyl) terephthalate may be used in consideration of suppressing side reactions to a minimum.

The polyester resin molecular weight modifier may be added in an amount of 0.05 to 3 parts by weight with respect to 100 parts by weight of the polyester resin. Although optimal fiber gloss and optimal spinning stability may change depending on the combination of the polyester resin molecular weight modifier and the phosphite-based compound, if the polyester resin molecular weight modifier is in an amount of less than 0.05 parts by weight, the molecular weight adjusting effect decreases, and, if the polyester resin molecular weight modifier is in an amount of more than 3 parts by weight, the spinning stability is significantly reduced leading to yarn breakage and the like and the mechanical properties are significantly reduced as well because the molecular weight of the polyester resin functioning as the matrix is too low.

The polyester resin composition may contain 0 to 5 parts by weight of sodium antimonate with respect to 100 parts by weight of the polyester resin. In one or more embodiments of the present invention, sodium antimonate has the effect of further improving the flame retardance of the polyester-based fiber for artificial hair, and is used as appropriate when the flame retardance has to be improved. Note that there is no problem even when sodium antimonate reacts with a halogen element during melt kneading to form another compound. Furthermore, the particle size of the antimony compound may be small in view of spinnability and color development property, and the average particle size may be 5 μm or less, or 2 μm or less. The average particle size refers to a median diameter (d50) as measured by a laser diffraction particle size analyzer.

The polyester-based fiber for artificial hair according to one or more embodiments of the present invention can be produced by melt spinning the above-described polyester composition into yarns. For example, the polyester-based fiber for artificial hair can be produced, by melt kneading a polyester resin composition obtained by mixing the above-described polyester resin, brominated epoxy-based flame retardant, polyester resin molecular weight modifier, and phosphite-based compound each in a predetermined amount, and melt spinning a polyester composition after the melt kneading into yarns. As described above, if a polyester resin composition is used that is obtained by adding a brominated epoxy-based flame retardant, a polyester resin molecular weight modifier, and a phosphite-based compound each in a predetermined amount to a polyester resin, yarn breakage and nozzle clogging are less likely to occur during spinning, and thus a polyester-based fiber for artificial hair can be stably produced. It may be possible that the above-described components such as the polyester resin, the brominated epoxy-based flame retardant, the polyester resin molecular weight modifier, and the phosphite-based compound are dry blended and then melt kneaded using various ordinary kneading machines. Examples of kneading machines include a single-screw extruder, a twin-screw extruder, a roll, a Banbury mixer, and a kneader. In particular, the twin-screw extruder may be used in terms of adjusting the degree of kneading and the ease of operation. The melt kneaded polyester resin composition is pelletized.

In order to increase the spinning stability, the polyester resin composition may have a melt viscosity at a temperature of 280° C. of not less than 80 and not more than 700 Pa·s, 100 to 650 Pa·s, 150 to 600 Pa·s, or 200 to 500 Pa·s. The melt viscosity of the polyester resin composition can be grasped by pelletizing the polyester resin composition after melt kneading, and measuring the melt viscosity of the obtained pellets, as described later.

In the case where the polyester-based fiber for artificial hair according to one or more embodiments of the present invention is produced through melt spinning using an ordinary melt spinning method, for example, the melt kneaded and pelletized polyester resin composition is melt spun into yarns while the temperatures of an extruder, a gear pump, a spinneret, and the like are set to 250 to 310° C. Then, the obtained spun yarns are allowed to pass through a heated tube, cooled to a temperature of not more than the glass transition point of the polyester resin, and wound up at a speed of 50 to 5000 m/min, and thus spun yarns (undrawn yarns) are obtained. Moreover, the spun yarns may also be cooled in a water bath containing cooling water so as to control the fineness. The temperature and length of the heated tube, the temperature and amount of the cooling air applied, the temperature of the cooling water bath, the cooling time, and the winding speed can be adjusted appropriately in accordance with the extrusion rate of the polymer and the number of holes of the spinneret.

In one or more embodiments of the present invention, it is possible that the obtained spun yarns (undrawn yarns) are hot drawn. The drawing may be performed by either a two-step method or a direct drawing method. In the two-step method, the spun yarns are wound once, and then drawn. In the direct drawing method, the spun yarns are drawn continuously without winding. The hot drawing may be performed by a single-stage drawing method or a multi-stage drawing method that includes two or more stages. The heating means for the hot drawing may be a heating roller, a heat plate, a steam jet apparatus, or a hot water bath, which can be used in combination as desired.

As necessary, the polyester-based fiber for artificial hair according to one or more embodiments of the present invention may contain various kinds of additives such as a flame retardant other than the brominated epoxy-based flame retardant that is a component, a heat-resistant agent, a photostabilizer, a fluorescer, an antioxidant, an antistatic agent, a pigment, a plasticizer, and a lubricant. By allowing the polyester-based fiber for artificial hair to contain a pigment, spun-dyed fibers can be obtained. Further, the polyester-based fiber for artificial hair can be rendered closer to human hair by adjusting the tactile feel and texture through use of a finishing oil such as a fiber surface treatment agent and a softener.

The polyester-based fiber for artificial hair according to one or more embodiments of the present invention is a fiber in the form of non-crimped yarn. Further, from the viewpoint of being suitable for artificial human hair, the fineness of the fiber may be 10 to 100 dtex, 20 to 90 dtex, or 35 to 80 dtex.

The polyester-based fiber for artificial hair according to one or more embodiments of the present invention has gloss and a tactile feel close to that of human hair, and also has good flame retardance and good spinnability. Further, this fiber is excellent in terms of curl setting properties using a heat instrument for beauty treatment (hair iron, etc.), and is excellent also in terms of curl retention properties. Further, this fiber has heat resistance enabling a heat instrument for beauty treatment (hair iron, etc.) to be used at 160 to 240° C., is unlikely to catch fire, and has a self-extinguishing property. Further, in one or more embodiments of the present invention, unevenness on the fiber surface may be provided by adding a dull additive.

In the case where the polyester-based fiber for artificial hair according to one or more embodiments of the present invention is spun-dyed, the fiber can be used as it is. However, in the case where the fiber is not spun-dyed, the fiber can be dyed under the same conditions as that of ordinary polyester fibers. As a pigment, a dye, an assistant, and the like to be used for dying, those having weather resistance and flame retardance can be used.

The polyester-based fiber for artificial hair according to one or more embodiments of the present invention can be directly used alone as artificial hair. Alternatively, this fiber can be used as an artificial hair product in combination with other fiber materials for artificial hair such as modacrylic fibers, polyvinyl chloride fibers, nylon fibers, protein fibers, and the like, and natural fibers such as human hair and animal hair.

A hair ornament product formed using the polyester-based fiber for artificial hair according to one or more embodiments of the present invention has gloss that is not unnatural when the hair ornament product is worn, and is excellent in terms of tactile feel and flame retardance. The hair ornament product is not particularly limited and may be, for example, a hair wig, a hairpiece, a weaving, a hair extension, braid hair, a hair accessory, or doll hair.

EXAMPLES

Hereinafter, one or more embodiments of the present invention will be more specifically described by way of examples, but the present invention is not limited to these examples.

Raw materials used in the examples and comparative examples are listed below. It should be noted that, commercially available general reagents were used for reagents whose manufacturers are not specified particularly below.

Polyester resin 1: polyethylene terephthalate, "BK-2180" manufactured by Mitsubishi Chemical Corporation, IV=0.83

Polyester resin 2: polybutylene terephthalate, "Novaduran 5020" manufactured by Mitsubishi Engineering-Plastics Corporation Brominated epoxy-based flame retardant: SR-T20000 (manufactured by Sakamoto Yakuhin Kogyo Co., Ltd.)

Phosphite-based compound 1: bis(2,6-di-t-butyl-p-tolyl) pentaerythritol diphosphite, "PEP36" manufactured by ADEKA Corporation Phosphite-based compound 2: bis(2,4-di-t-butylphenyl) pentaerythritol diphosphite, "Ultranox626" manufactured by Addivant Phosphite-based compound 3: distearyl pentaerythritol diphosphite, "PEP8" manufactured by ADEKA Corporation Molecular weight modifier 1: bis(2-hydroxyethyl) terephthalate Molecular weight modifier 2: dimethyl terephthalate Molecular weight modifier 3: terephthalic acid Antimony compound 1: sodium antimonate, "SAA" manufactured by Nihon Seiko Co., Ltd.

Antimony compound 2: antimony trioxide, "PatoxM" manufactured by Nihon Seiko Co., Ltd.

Examples 1 to 12 and Comparative Examples 1 to 6

The raw materials were each dried to a moisture content of 100 ppm or less, and then dry blended in their respective proportions shown in Table 1. The polyester resin composition thus obtained was supplied to a twin-screw extruder (trade name "TEX44" manufactured by Japan Steel Works, LTD.) and melt kneaded at a barrel temperature of 270° C., and then was formed into pellets. The obtained pellets were dried to a moisture content of 100 ppm or less. Next, the dried pellets were supplied to a melt spinning machine (trade name "SV30" manufactured by Shinko Ind. Ltd.), and a molten polymer was extruded through a spinneret with nozzle holes having a cocoon-shaped cross section (with an aspect ratio of 1.4:1) at a barrel temperature of 270° C. The extruded polymer was air-cooled with a cooling air at 20° C. and wound up at a speed of 105 m/min, thereby providing undrawn yarns. The resultant undrawn yarns were drawn to 3.5 times using a heating roller at 75° C., heat-treated using the heating roller at 200° C., and wound up at a speed of 45 m/min. Thus, a polyester-based fiber (multifilament) for artificial hair with a single fiber fineness of about 60 dtex was produced.

The polyester-based fibers of the examples and the comparative examples were evaluated in terms of melt viscosity, gloss, spinning stability, flame retardance, and tactile feel as follows. Table 1 below shows the results.

(Melt Viscosity)

A melt viscosity (Pa·s) of a polyester resin composition (pellet) was measured under the conditions of a test speed of 50 mm/min, an orifice of 0.05 cm, a barrel radius of 0.4775 cm, and a barrel temperature of 280° C. using a capilograph (model name "CAPILOGRAPH 3B" manufactured by Toyo Seiki Seisaku-sho, Ltd.).

(Gloss)

Gloss was determined visually under sunlight using a tow filament having a length of 30 cm and a total fineness of 100,000 dtex, by the following criteria.

A: Equal to gloss of human hair.

B: Almost equal to gloss of human hair.

C: Looks unnatural due to the difference from gloss of human hair.

D: Remarkably different from gloss of human hair.

(Spinning Stability)

Spinning was performed for eight hours under the spinning conditions shown in the examples, and spinability determined by the following criteria based on yarn breakage.

A: Spinning is stably performed without yarn breakage.

B: Although spinning is stably performed, yarn breakage occurs often, and slight nozzle clogging occurs.

C: Spinning is not stably performed due to yarn breakage and nozzle clogging, and unevenness in fineness is remarkably large.

(Flame Retardance)

Flame retardance was determined by the following four criteria based on the LOI and whether or not dripping occurred in a burning test.

A: Dripping does not occur, and LOI is 25 or more.

B: Dripping does not occur, and LOI is 23 or more and less than 25.

C: Dripping occurs, and LOI is 23 or more.

D: Regardless of whether or not dripping occurs, LOI is less than 23.

(Measurement of LOI)

The LOI was measured as defined in JIS L 1091 E (oxygen index test). Specifically, filaments (length: 16 cm, weight: 0.25 g) were lightly tied together at both ends with a double-sided adhesive tape, inserted in a twisting device, and twisted. After the filaments were sufficiently twisted, the filaments were folded in half at the middle and twisted together. The resultant filaments were fastened at both ends with a Cellophane (registered trademark) tape so that the overall length was 7 cm. The thus obtained sample was pre-dried at 105° C. for 60 minutes and further dried in a desiccator for at least 30 minutes. The oxygen concentration of the dried sample was adjusted to a predetermined value. After 40 seconds, the top of the sample was ignited using an igniter with the igniter flame restricted to 8 to 12 mm. The igniter was removed after the sample ignited. The oxygen concentration at which 5 cm or more of the sample burned or the sample continued burning for at least 3 minutes was obtained. The test was repeated three times under the same conditions. Thus, the limiting oxygen index (LOI) was obtained.

(Burning Test)

First, 0.7 g of filaments that were cut to a length of 150 mm was tied into a bundle. One end of the bundle was clamped and fixed to a stand so that the effective length was 120 mm, and the bundle was suspended vertically. A flame of 20 mm was applied to the fixed filaments for three seconds to cause the filaments to burn, and whether or not dripping occurred was observed.

(Tactile Feel)

Sensory evaluation was performed in comparison with human hair, and the tactile feel was evaluated by the following criteria.

A: Texture is very soft and equal to that of human hair.
B: Texture is soft and similar to that of human hair.
C: Texture is slightly harder than that of human hair.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Polyester resin 1 | Parts by weight | 100 | 100 | 100 | 100 | 100 | 100 | 100 | 100 | 100 | 100 |
| Polyester resin 2 | | | | | | | | | | | |
| Brominated epoxy-based flame retardant | | 20 | 20 | 20 | 20 | 20 | 20 | 10 | 28 | 20 | 20 |
| Phosphite-based compound 1 | | 1 | 1 | | | 0.4 | 1.5 | 1 | 1 | 1 | 1 |
| Phosphite-based compound 2 | | | | 1 | | | | | | | |
| Phosphite-based compound 3 | | | | | 1 | | | | | | |
| Molecular weight modifier 1 | | 0.5 | | 0.5 | 0.5 | 0.2 | 0.8 | 0.5 | 0.5 | 0.5 | |
| Molecular weight modifier 2 | | | 0.5 | | | | | | | | |
| Molecular weight modifier 3 | | | | | | | | | | | 0.1 |
| Antimony compound 1 | | 2 | 2 | 2 | 2 | 2 | 2 | 2 | 2 | | 2 |
| Antimony compound 2 | | | | | | | | | | | |
| Melt viscosity (Pa · s) | | 350 | 360 | 400 | 320 | 360 | 320 | 340 | 330 | 350 | 320 |
| Gloss | | A | B | A | B | A | A | B | B | B | A |
| Spinning stability | | A | A | A | B | A | A | A | B | A | A |
| Flame retardance | LOI | 28.0 | 28.0 | 28.0 | 27.5 | 28.0 | 28.5 | 25.5 | 29.5 | 28.0 | 28.0 |
| | | A | A | A | A | A | A | A | A | A | A |
| Tactile feel | | B | A | B | B | A | A | B | A | B | B |

| | | Example | | Comparative Example | | | | | |
|---|---|---|---|---|---|---|---|---|---|
| | | 11 | 12 | 1 | 2 | 3 | 4 | 5 | 6 |
| Polyester resin 1 | Parts by weight | 100 | | 100 | 100 | 100 | 100 | 100 | 100 |
| Polyester resin 2 | | | 100 | | | | | | |
| Brominated epoxy-based flame retardant | | 20 | 25 | 20 | 20 | 20 | 20 | 20 | 20 |
| Phosphite-based compound 1 | | | 1 | | | 1 | | 0.1 | 1 |
| Phosphite-based compound 2 | | 1 | | | | | | | |
| Phosphite-based compound 3 | | | | | | | | | |
| Molecular weight modifier 1 | | | | | | | 0.5 | 0.02 | 5 |
| Molecular weight modifier 2 | | | | | | | | | |
| Molecular weight modifier 3 | | 0.2 | 0.1 | | | | | | |
| Antimony compound 1 | | 2 | 3 | 2 | | 2 | 2 | 2 | 2 |
| Antimony compound 2 | | | | | 2 | | | | |
| Melt viscosity (Pa · s) | | 350 | 300 | 360 | 200 | 720 | 220 | 370 | — |
| Gloss | | B | A | D | A | C | C | D | — |
| Spinning stability | | A | A | A | C | C | A | A | C |
| Flame retardance | LOI | 27.5 | 26.5 | 28.0 | 29.0 | 28.0 | 27.0 | 28.0 | — |
| | | A | A | A | A | A | A | A | — |
| Tactile feel | | A | B | B | C | C | C | B | — |

It is seen from the results shown in Table 1 that, in the examples where a brominated epoxy-based flame retardant, a phosphite-based compound, and a polyester resin molecular weight modifier were contained, gloss close to that of human hair was obtained by suppressing glare inherent to polyester resin, and the spinning stability was excellent. Furthermore, the flame retardance was high and the tactile feel was good.

On the other hand, in Comparative Example 1 where a phosphite-based compound and a molecular weight modifier were not contained, although the spinning stability was good, the gloss was high and remarkably different from the gloss of human hair. In Comparative Example 2 where an antimony trioxide was used as an antimony compound, although gloss close to that of human hair was obtained, problems such as breakage of yarns and generation of foreign substances occurred, and the spinning stability was poor. Furthermore, the tactile feel was also poor. In Comparative Example 3 where only a phosphite-based compound was added, the melt viscosity was high, and yarn breakage occurred during spinning, and unevenness in the fineness was significant. Furthermore, the tactile feel was also poor. In Comparative Example 4 where only a polyester resin molecular weight modifier was added, the gloss was insufficient, and the tactile feel was hard. In Comparative Example 5 where the amount of phosphite added was less than 0.2 parts by weight and the amount of polyester resin molecular weight modifier added was less than 0.05 parts by weight, the gloss was high and remarkably different from the gloss of human hair. In Comparative Example 6 where 5 parts by weight of molecular weight modifier was added, the melt viscosity was considerably low, and there was significant yarn breakage during spinning, and thus no sample was obtained.

FIG. 1 shows a SEM photograph (5000×) along a cross-section in a direction parallel to a fiber axis direction of the polyester-based fiber for artificial hair in Example 1. In FIG. 1, the flat pieces dispersed in the form of islands are agglomerates of the brominated epoxy-based flame retardant. In a polyester-based fiber containing a brominated epoxy-based flame retardant, the brominated epoxy-based flame retardant is typically dispersed in a linear form to the level where island-like shapes are not seen, and the fiber has high gloss inherent to polyester resin, whereas, it seems that the agglomerates dispersed in the form of islands provide the fiber surface with appropriate unevenness, thereby suppressing the surface gloss.

What is claimed is:

1. A polyester-based fiber for artificial hair, comprising a polyester-based resin composition,
   wherein the polyester-based resin composition comprises:
   100 parts by weight of a polyester resin;
   5 to 40 parts by weight of a brominated epoxy-based flame retardant;
   0.05 to 3 parts by weight of a molecular weight modifier for reducing a molecular weight of a polyester resin; and
   0.2 to 3 parts by weight of a phosphite-based compound,
   wherein the polyester resin is one or more selected from the group consisting of polyalkylene terephthalate and a copolymerized polyester comprising polyalkylene terephthalate, and
   wherein the molecular weight modifier is one or more selected from the group consisting of terephthalic acid, isophthalic acid, dimethyl terephthalate, and bis(2-hydroxyethyl) terephthalate.

2. The polyester-based fiber for artificial hair according to claim 1, wherein the phosphite-based compound has a pentaerythritol diphosphite structure represented by the following general formula (1):

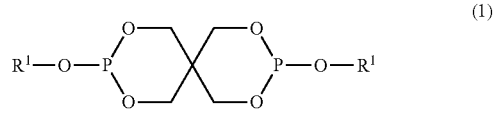

wherein each $R^1$ is independently a linear or branched hydrocarbon group with 4 to 20 carbon atoms, or an aromatic hydrocarbon group substituted with an alkyl group or an aryl group.

3. The polyester-based fiber for artificial hair according to claim 1, wherein the polyester-based resin composition further comprises 0 to 5 parts by weight of sodium antimonate.

4. The polyester-based fiber for artificial hair according to claim 1, wherein the polyalkylene terephthalate is at least one polymer selected from the group consisting of polyethylene terephthalate, polypropylene terephthalate, polybutylene terephthalate, and polycyclohexane dimethylene terephthalate.

5. The polyester-based fiber for artificial hair according to claim 1, wherein the brominated epoxy-based flame retardant has a structure represented by the following general formula (2):

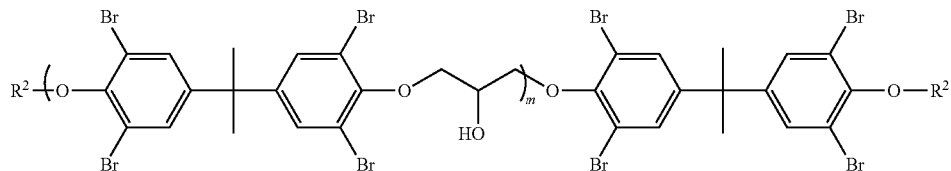

wherein m is 10 to 200, and each $R^2$ is independently a functional group represented by the following general formula (3) or (4):

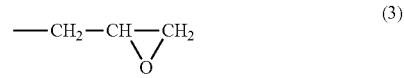

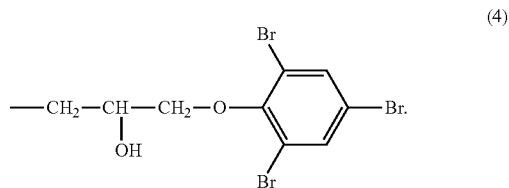

6. The polyester-based fiber for artificial hair according to claim 1, wherein the copolymerized polyester comprises 80 mol % or more of polyalkylene terephthalate.

7. A method for producing the polyester-based fiber for artificial hair, the method comprising:
   melt kneading a polyester resin composition; and
   melt spinning the polyester resin composition after the melt kneading into yarns, thereby obtaining the polyester-based fiber for artificial hair,
   wherein the polyester resin composition comprises:
   100 parts by weight of a polyester resin;
   5 to 40 parts by weight of a brominated epoxy-based flame retardant;
   0.05 to 3 parts by weight of a molecular weight modifier for reducing a molecular weight of a polyester resin; and
   0.2 to 3 parts by weight of a phosphite-based compound, wherein the polyester resin is one or more selected from the group consisting of polyalkylene terephthalate and a copolymerized polyester comprising polyalkylene terephthalate, and wherein the molecular weight modifier is one or more selected from the group consisting of terephthalic acid, isophthalic acid, dimethyl terephthalate, and bis(2-hydroxyethyl) terephthalate.

8. A hair ornament product comprising a polyester-based fiber, wherein the polyester-based fiber comprises a polyester-based resin composition comprising:

100 parts by weight of a polyester resin;

5 to 40 parts by weight of a brominated epoxy-based flame retardant;

0.05 to 3 parts by weight of a molecular weight modifier for reducing a molecular weight of a polyester resin; and 0.2 to 3 parts by weight of a phosphite-based compound, wherein the polyester resin is one or more selected from the group consisting of polyalkylene terephthalate and a copolymerized polyester comprising polyalkylene terephthalate, and wherein the molecular weight modifier is one or more selected from the group consisting of terephthalic acid, isophthalic acid, dimethyl terephthalate, and bis(2-hydroxyethyl) terephthalate.

9. The hair ornament product according to claim 8, wherein the hair ornament product is one selected from the group consisting of a hair wig, a hairpiece, a weaving, a hair extension, braid hair, a hair accessory, and doll hair.

10. The polyester-based fiber for artificial hair according to claim 1, wherein the polyester-based resin composition comprises 0.05 to 0.8 parts by weight of the molecular weight modifier.

11. The method according to claim 7, wherein the polyester-based resin composition comprises 0.05 to 0.8 parts by weight of the molecular weight modifier.

12. The hair ornament product according to claim 8, wherein the polyester-based resin composition comprises 0.05 to 0.8 parts by weight of the molecular weight modifier.

* * * * *